United States Patent
Ickes, III et al.

(10) Patent No.: US 9,226,634 B2
(45) Date of Patent: Jan. 5, 2016

(54) MODULAR HUB CONSOLE FOR FLOOR CLEANING MACHINE

(75) Inventors: John C. Ickes, III, Rockford, MN (US);
Matthew R. Hetler, Crystal, MN (US);
Daniel A. Leitschuh, Fridley, MN (US);
Adam S. Foley, Blaine, MN (US);
Richard S. Walters, Hugo, MN (US)

(73) Assignee: Tennant Company, Minneapolis, MN (US)

( * ) Notice: Subject to any disclaimer, the term of this patent is extended or adjusted under 35 U.S.C. 154(b) by 267 days.

(21) Appl. No.: 12/940,670

(22) Filed: Nov. 5, 2010

(65) Prior Publication Data

US 2011/0132402 A1 Jun. 9, 2011

Related U.S. Application Data

(60) Provisional application No. 61/258,679, filed on Nov. 6, 2009.

(51) Int. Cl.
*A47L 11/10* (2006.01)
*A47L 11/40* (2006.01)
(Continued)

(52) U.S. Cl.
CPC ................ *A47L 11/40* (2013.01); *A47L 11/24* (2013.01); *A47L 11/28* (2013.01); *A47L 11/292* (2013.01); *A47L 11/294* (2013.01); *B60K 37/02* (2013.01); *B60K 37/06* (2013.01); *B62D 1/04* (2013.01); *B62D 1/105* (2013.01); *B62D 1/16* (2013.01); *B60Y 2200/15* (2013.01)

(58) Field of Classification Search
CPC ....... A47L 11/24; A47L 11/28; A47L 11/292; A47L 11/294; B62D 1/04; B62D 1/16
USPC ................. 134/6, 42; 15/3, 3.12, 320, 340.1; 200/61.54, 61.55, 61.56, 61.57
See application file for complete search history.

(56) References Cited

U.S. PATENT DOCUMENTS 4,421,960 A * 12/1983 Arima et al. ............... 200/61.54
4,429,588 A    2/1984 Emundts
(Continued)

FOREIGN PATENT DOCUMENTS

DE    19704048 A1    8/1998
EP    1199243 A1    4/2002
(Continued)

OTHER PUBLICATIONS

International Search Report and Written Opinion, dated Jan. 14, 2011 for PCT Application No. PCT/US2010/055635, 11 pages.
(Continued)

*Primary Examiner* — Saeed T Chaudhry
(74) *Attorney, Agent, or Firm* — Fredrickson & Byron, P.A.

(57) ABSTRACT

A floor surface maintenance vehicle, and methods of using a floor surface maintenance vehicle, the vehicle including a frame, a plurality of wheels, a cleaning component extending from an underside of the frame, a steering wheel having a central aperture and rotatable about a central axis, and a steering wheel hub located within the central aperture of the steering wheel and having a panel, wherein the panel is stationary relative to the central axis. Buttons are provided on the panel, including a first button that is C-shaped and extends around a portion of a periphery of the panel. The C-shaped button may be used to control frequently used functions such as cleaning functions or operation of a horn, for example.

19 Claims, 5 Drawing Sheets

(51) Int. Cl.
- *B62D 1/04* (2006.01)
- *B62D 1/16* (2006.01)
- *A47L 11/294* (2006.01)
- *A47L 11/292* (2006.01)
- *A47L 11/28* (2006.01)
- *A47L 11/24* (2006.01)
- *B60K 37/02* (2006.01)
- *B60K 37/06* (2006.01)
- *B62D 1/10* (2006.01)

(56) References Cited

U.S. PATENT DOCUMENTS

| | | | |
|---|---|---|---|
| 4,604,912 A | | 8/1986 | Sugita |
| 4,616,224 A | | 10/1986 | Reighard |
| 4,638,131 A | | 1/1987 | Kidd |
| 5,072,628 A | | 12/1991 | Oki |
| 5,219,415 A | * | 6/1993 | Weinstein ............ 200/61.54 |
| 5,465,632 A | | 11/1995 | Oki |
| 5,802,665 A | | 9/1998 | Knowlton |
| 6,145,402 A | | 11/2000 | Nishitani |
| 6,442,789 B1 | | 9/2002 | Legatt |
| 6,474,688 B1 | | 11/2002 | Bogren |
| 7,040,653 B1 | | 5/2006 | Breed |
| 2006/0156498 A1 | * | 7/2006 | Venard et al. .......... 15/52.1 |
| 2006/0286944 A1 | * | 12/2006 | Songwe ................ 455/99 |
| 2008/0197991 A1 | * | 8/2008 | Magnussen ............ 340/441 |
| 2010/0212688 A1 | * | 8/2010 | Goff .................... 134/6 |

FOREIGN PATENT DOCUMENTS

| | | |
|---|---|---|
| EP | 1686039 A1 | 8/2006 |
| WO | 2004000605 A2 | 12/2003 |

OTHER PUBLICATIONS

Supplementary European Search Report for corresponding European Patent Application No. 10829153 mailed Jan. 2, 2014.
Non-Machine English Translation of German Publication No. DE19704048A1 (previously cited), Aug. 6, 1998, 5 pages.

\* cited by examiner

MODULAR HUB CONSOLE FOR FLOOR CLEANING MACHINE

PRIORITY CLAIM

The present application claims priority to U.S. Provisional Patent application No. 61/258,679, filed Nov. 6, 2009, the disclosure of which is hereby incorporated by reference in the entirety.

BACKGROUND

Industrial cleaning machines for relatively large floor areas, for example, of commercial, industrial, public or institutional spaces, are typically integrated with an operator-driven vehicle that the operator maneuvers via a steering wheel assembly. These cleaning machines typically employ a scrubbing system and/or a sweeping system. Depending upon the application, for example, according to the type of floor area to be cleaned, a scrubbing system of a cleaning machine may be equipped to carry out one or more special scrubbing technology operations, that enhance a set of standard scrubbing operations common among a group of scrubbing machines of a particular type. Commercially available examples of such machines include models T7 and T20 Rider-Scrubbers, and the models M20 and M30 Integrated Scrubber-Sweepers, all available from Tennant Company of Minneapolis, Minn.

Many types of cleaning machines automatically carry out pre-programmed scrubbing and/or sweeping operations while the operator attends to the steering of the machine over the floor surface to be cleaned. However, there are some scrubbing and/or sweeping related operations that require the operator to make adjustments during the floor scrubbing process, in order to do a proper job of cleaning. Furthermore, it is desirable that the operator be aware of certain machine parameters and how they may be changing during the cleaning process.

SUMMARY

According to embodiments of the present invention disclosure, a cleaning machine or vehicle includes a steering wheel and a hub console assembly, which is mounted within an outer perimeter of the steering wheel and may be used to control certain scrubbing and/or sweeping related operations while steering the scrubbing machine. The hub console assembly preferably includes a panel overlaying an electronics module, both of which may be mounted so as to remain stationary while the steering wheel is being turned or rotated thereabout. In addition to touch control buttons, which are activated at the interface of the panel, the hub console assembly may further include one or more active displays to convey information to the operator of the scrubbing machine, for example, concerning machine settings and/or the status of one or more systems of the machine; according to some embodiments, the active displays are formed by one or more LED elements of the electronics module that illuminate portions of the panel, and/or by one or more LCD display elements of the electronics module that are integrated into the panel.

According to some preferred embodiments, the touch control buttons, which may be most commonly used by the operator during cleaning operations, are located in closest proximity to an outer perimeter of the hub console assembly, within closest reach to an operator's hands that are steering with the steering wheel. Furthermore, one or more of these buttons may span a relatively large surface area of the panel, along an outer perimeter of the assembly, for example, to reduce the probability that the operator will have to shift his hands on the steering wheel in order to activate the button while steering. Examples of these most commonly used buttons, according to some embodiments, will be described in greater detail below, and may include, without limitation: a horn button and/or a fluid on/off button and/or a fluid flow control button.

The hub console assembly, according to some embodiments, may further include a touch control button to activate or deactivate a special scrubbing technology operation, for example, that enhances standard scrubbing operations, and related display, for example, LED illumination, to indicate to the operator when the special scrubbing technology is activated. In some preferred embodiments, the console assembly also provides a display that indicates which special scrubbing technology, of a plurality of possible scrubbing technologies, is available to the operator of a particular cleaning machine, for example, via the position of an LED in the electronics module, with respect to the panel assembled thereover, so that the LED illuminates that portion of the panel corresponding to the special scrubbing technology included in that particular machine. Panels, according to some preferred embodiments, are standardized for a modular hub console assembly that may include any one of a set of various electronic modules which are incorporated across various machine platforms, and/or that vary according to a special scrubbing technology that is selected for inclusion in a particular cleaning machine.

In some embodiments, the floor surface maintenance vehicle includes a frame, a plurality of wheels, a fluid tank, a cleaning component extending from an underside of the vehicle, a steering wheel having a central aperture and rotatable about a central axis, a steering wheel hub located within the central aperture of the steering wheel and having a panel, wherein the panel is stationary relative to the central axis, and a first button provided on the panel, wherein the first button is C-shaped and extends around a portion of a periphery of the panel. The first button may control a cleaning operation of the vehicle. The first button may occupy an arc of about 30 to about 90 degrees of a circumference of the periphery of the panel. The panel and hub console may be located within the aperture of the steering wheel but may be spaced apart from the steering wheel.

In some embodiments, the floor surface maintenance vehicle may also include a second button on the panel and occupying an arc of about 30 to about 90 degrees of a circumference of the periphery of the panel, wherein the second button controls a cleaning operation of the vehicle. In some embodiments, the first and second buttons each control the same cleaning function, such as turning on and off a flow of fluid from the fluid tank. The first and second buttons may be located at mirror image locations on opposite sides (left and right sides, as viewed by an operator of the vehicle) of the panel.

In some embodiments, the first button is located in approximately one half of the circumference of the panel. The first button may control a horn. In some embodiments, it is located on a top half of the panel. In still other embodiments, the vehicle also includes a second and a third button, wherein each of the second and third buttons are C-shaped, extend around a portion of the periphery of the panel, and occupy between about one eighth to about one quarter of the circumference of the periphery of the panel. These second and third buttons may control a flow of fluid from the fluid tank.

The floor surface maintenance machine may also include other buttons, such as one or more buttons which are located more centrally on the panel. Such buttons may control a cleaning function of the vehicle and may be located in proximity to associated indicator lights which become illuminated when the function of the second button has been activated. In some embodiments, the panel may include one or more buttons to increase or decrease the rate of flow of fluid from the fluid tank. In some embodiments, the panel may further include an active display and/or a power button.

Embodiments of the invention further include methods of cleaning floors using the floor cleaning vehicles as described herein. Such methods may include activating the floor surface maintenance vehicle, driving the floor surface maintenance vehicle over the floor to be cleaned; and pressing one or more buttons on the panel to control the cleaning operations, such as pressing the first button to supply the fluid to the floor.

DETAILED DESCRIPTION

The following detailed description is exemplary in nature and is not intended to limit the scope, applicability, or configuration of the invention in any way. Rather, the following description provides practical illustrations for practicing exemplary embodiments of the present invention. Disclosed embodiments will hereinafter be described in conjunction with the appended drawings, wherein like numerals denote like elements. The drawings are illustrative of particular exemplary embodiments and methods and therefore do not limit the scope of the invention. The drawings are not necessarily to scale and are intended for use in conjunction with the explanations in the following detailed description. Those skilled in the art will recognize that many of the examples provided have suitable alternatives that can be utilized.

Figures 1A, 1B:
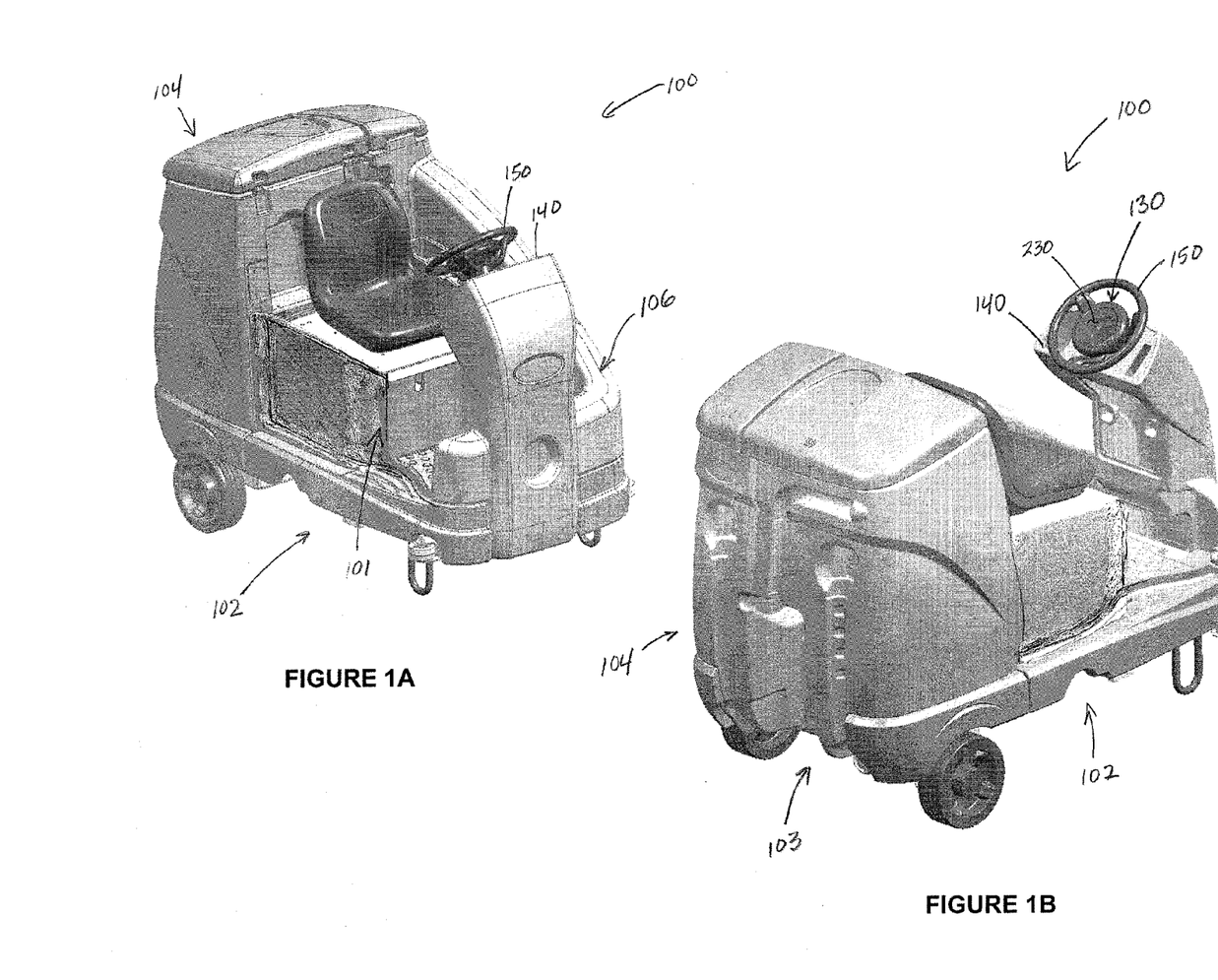
FIGS. 1A and 1B are front and rear perspective views of a surface maintenance machine.

FIGS. 1A-B are front and rear perspective views, respectively, of an exemplary floor surface cleaning machine 100. Although the embodiment shown is a scrubbing machine, it should be noted that alternative types of cleaning machines, for example, those that employ a sweeping system or a combination sweeping and scrubbing system are also included in embodiments of the invention. FIGS. 1A-B illustrate machine 100 including one or more rear compartments 104, in which a tank of scrubbing fluid and a recovery tank may be contained, a side compartment 106, which may contain one or more auxiliary tanks, and a steering wheel 150, which is positioned with respect to a seat of machine 100, so that a seated operator of machine 100 may steer a front center wheel of machine 100. Alternatively, the fluid tank may be located in a side compartment or other location or in more than one location. Machine 100 is preferably powered by one or more batteries that may be contained in a compartment 101 beneath the seat. Alternately, the power source may be an internal combustion engine, or one or more power cells, may be employed to power machine 100. Although not shown, it should be understood that cleaning components may extend from an underside of the machine 100. For example, one or a pair of scrubbing brushes may be mounted to extend from an underside of a middle portion 102 of machine 100, and that a vacuum-assisted squeegee may be mounted to extend from a lower rearward portion 103 of machine 100. Fluid, for example, clean water, which may be mixed with a detergent, is dispensed from the scrubbing fluid tank to the floor beneath machine 100, in proximity to the scrubbing brushes, and soiled scrubbing fluid is vacuumed up by the squeegee into the recovery tank. Machine 100 also includes a feedback control system to operate these and other elements of machine 100, according to apparatus and methods which are known to those skilled in the art.

In alternative embodiments, the floor surface maintenance machines 100 may be combination sweeper and scrubber machines. In such embodiments, in addition to the elements describe above, the machines 100 may also include sweeping brushes and a hopper extending from the underside of the machine 100, with the sweeping brushes designed to direct dirt and debris into the hopper. In still other embodiments, the machine 100 may be a sweeper only. In such embodiments, the machine 100 may include the elements as described above for a sweeper and scrubber machine, but would not include the scrubbing elements such as scrubbers, squeegees and fluid storage tanks (for detergent, recovered fluid and clean water).

Figure 2A:
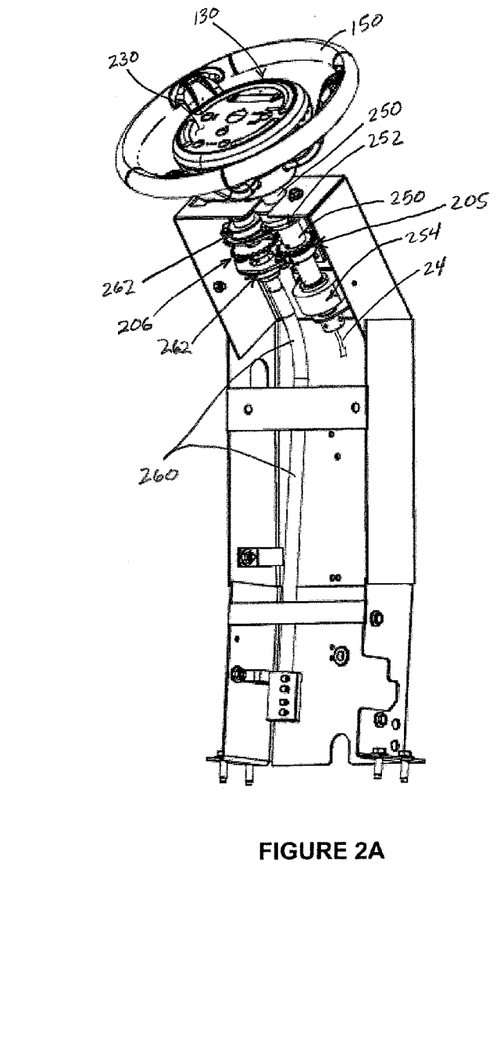
FIGS. 2A and 2B are views of a steering wheel and hub console assembly.
Figure 2B:
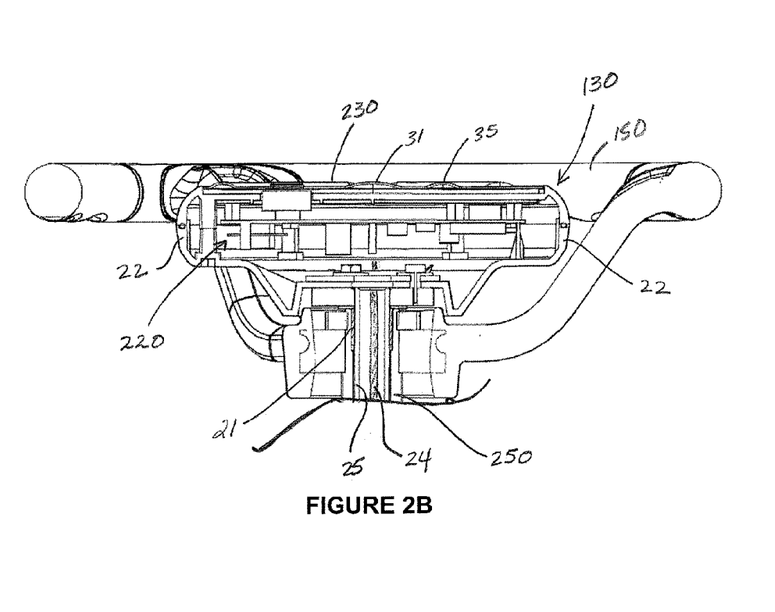

According to embodiments of the present invention, machine 100 further includes a hub console assembly 130, which is mounted to a central portion of steering wheel 150, within an outer perimeter thereof, so that an operator who steers machine 100 has relatively easy access to control and view a panel 230 of console assembly 130. Panel 230, according to some preferred embodiments, will be described in greater detail, below, in conjunction with FIGS. 3 and 4A-C. With reference to FIGS. 2A-B, hub console assembly 130 is preferably mounted so as to remain stationary while steering wheel 150 is being turned or rotated thereabout; yet, according to alternate embodiments, hub console assembly 130 may be mounted within steering wheel 150 so as to rotate therewith. FIG. 2A is a perspective view of a frame of machine 100 supporting one exemplary assembly that may be employed to transfer the rotation of steering wheel 150 to the front wheel of machine 100, while allowing hub console assembly 130 to remain stationary; and FIG. 2B is a section view through steering wheel 150 and hub console assembly 130. It should be noted that, in alternate embodiments of machine 100, steering wheel 150 may steer more than one front wheel and/or one or more rear wheels of machine 100.

FIGS. 2A-B illustrate steering wheel 150 being coupled to a hollow input shaft 250 through which an electrical cable 24 for hub console assembly 130 passes, preferably being guided by a stationary tube 25 that is joined to assembly 130 and about which input shaft 250 rotates, for example, via a journal bearing 21. A thrust washer may form an interface between a central portion of steering wheel 150 and hub console assembly 130, in proximity to the junction with stationary tube 25, to support the relative motion therebetween. FIG. 2B further illustrates a shell 22 of hub console assembly 130 containing circuit board-mounted electronics of an electronics module 220 which is coupled to panel 230. According to some preferred embodiments, network communications protocols are implemented by electronics module 220 in order to reduce a number of wires included in cable 24. Although not shown, additional electronics may be housed in the frame and connected to cable 24 therein.

In FIG. 2A, input shaft 250 is shown mounted to the frame through a flange bearing 252 and a pillow block bearing 254, and output shaft 260 is shown mounted to the frame through two flange bearings 262, which may be secured to the frame via a bracket. FIG. 2A further illustrates an input sprocket 205 mounted about input shaft 250 and an output sprocket 206 mounted about an output shaft 260. Although not shown, it may be appreciated that, according to some embodiments, a chain may be employed to couple input sprocket 205 to output sprocket 206 in order to drive rotation from input shaft 250 to output shaft 260. Output shaft 260 may include a wound spring universal joint, which is coupled to a stub shaft of the front wheel of machine 100. It should be noted that other types of assemblies that are known in the art for enabling stationary hub consoles within steering wheels may be employed by alternate embodiments of the present invention. Furthermore, the output of steering wheel 150 may be transferred to one or more wheels of machine 100 via hydraulics or cables, according to alternate embodiments.

Figure 3:
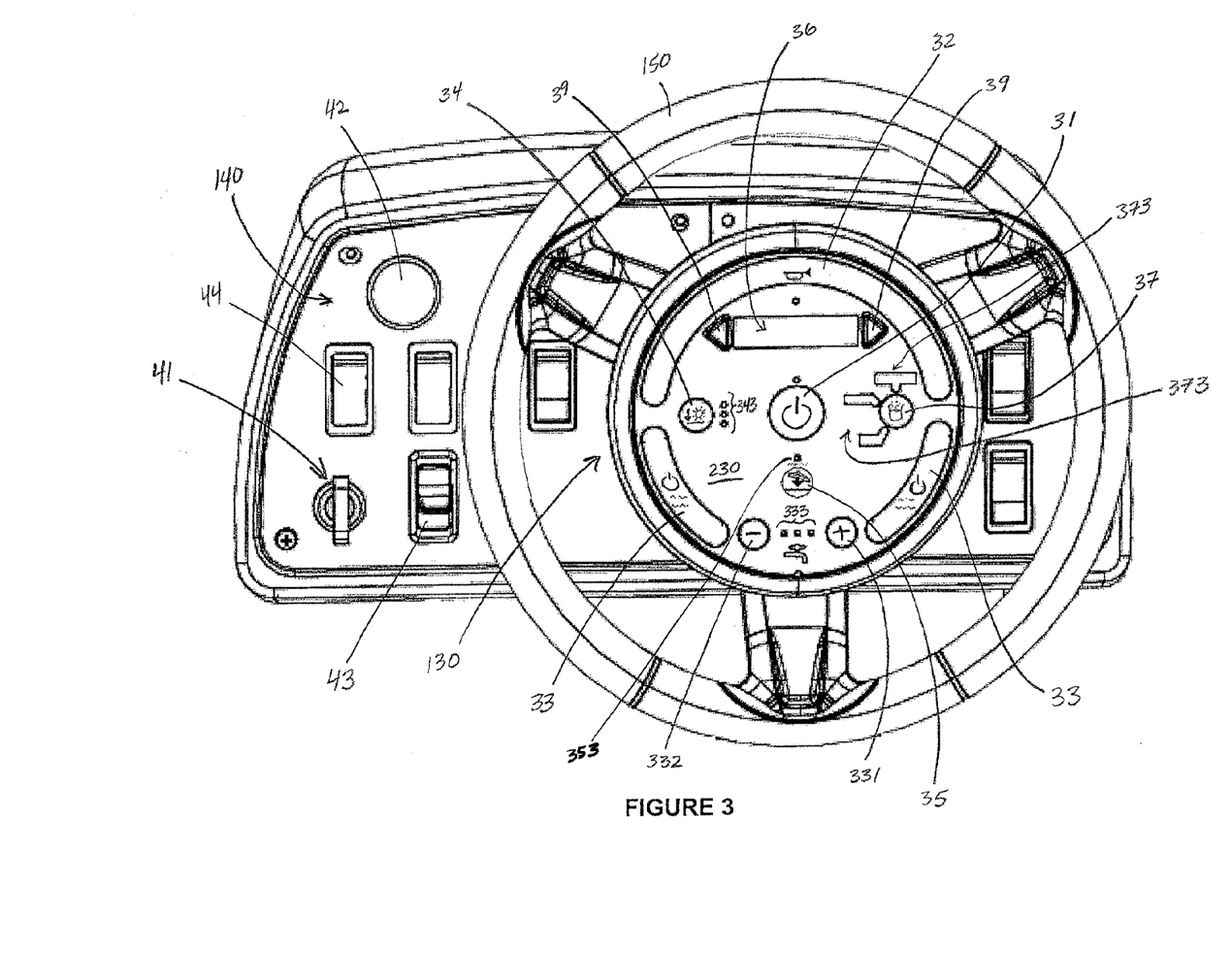
FIG. 3 is a plan view of a hub console assembly.

FIG. 3 is a plan view detailing an embodiment of a hub console assembly 130 which may be used with a scrubber machine showing a configuration of panel 230 in relation to some controls of machine 100 that are provided on a dash board 140 of machine 100. FIG. 3 illustrates panel 230 including various touch control buttons 31, 32, 33, 331, 332, 34, 35, 37 and 39 and various active displays 313, 333, 343, 353, 36, and 373. Panel 230 is shown including optional icon markings for many of the illustrated buttons and displays, which markings are useful in guiding an operators attention to a particular button or display. Buttons 31, 32, 33, 331, 332, 34, 35, 37 and 39 may be formed by raised portions of panel 230 that are coupled to corresponding switch members of an integrated circuit board of electronics module 220, which underlies panel 230 and is coupled, for example, via a ribbon cable, to another circuit board of electronics module 220 that is contained within shell 22 (FIG. 2B). Active displays 313, 333, 343, 353, and 373 are preferably formed by LED elements, which are mounted to the underlying circuit board of electronics module 220 at discrete locations that correspond in position to the associated display features of the overlying panel 230. Active display 36 may be an LCD display element that is integrated into panel 230 and extends through shell 22 in order to be coupled into electronics module 220. Although the buttons and displays of panel 230 will be described in the context of scrubbing operations, it should be understood that a similar configuration and/or arrangement of one or more of the buttons and/or one or more of the displays can be employed in alternative cleaning machines, for example, those that employ a sweeping system. Thus, according to some preferred embodiments, panel 230 can be employed by modular hub console assemblies across various machine platforms.

Prior to commencing scrubbing operations with machine 100, buttons 39, in conjunction with feedback from active display 36, may be used to set up and/or program electronics module 220 of hub console 230. Display 36 is preferably adapted to present messages formed by alpha-numeric strings and/or graphical symbols. During day to day use of machine 100, active display 36 may present information concerning various system parameters for an operator of machine 100 to track, for example, for maintenance purposes. According to the illustrated embodiment, display 36 is a two-line LCD element that may be divided into four parts in order to display, simultaneously, for example, indications of remaining battery life, accumulated hours of machine operation, amount of fluid remaining in the scrubbing fluid tank and amount of soiled fluid accumulated into the recovery tank. Active display 36 may further be adapted to present messages, via feedback from the control system of machine 100, that are useful to an operator, when troubleshooting problems encountered during scrubbing operations. In order to commence scrubbing operations, machine 100 is turned on, for example, via keyed starter 41 (shown on dash board 140), and then button 31 is pressed to power up scrubbing operations. According to the illustrated embodiment, when button 31 is pressed to power up, a display 313, formed by a single dot positioned alongside button 31, is illuminated.

Buttons 32 and 33 may be the most frequently used by the operator of machine 100 during scrubbing operations. Button 32, which is used to activate a horn of machine 100, and buttons 33, either of which are used to both turn off and turn on the flow of fluid being dispensed from the scrubbing fluid tank of machine 100, are shown being located in close proximity to an outer perimeter of hub console assembly 130 and spanning a relatively large surface area of panel 230, as compared with the remaining buttons, so as to be in relatively close reach when the operator is handling steering wheel 150, and to reduce a probability that the operator will need to shift his hands to activate one of buttons 32, 33 while steering. For reference, according to an exemplary embodiment, an outer diameter of hub console assembly 130 is approximately 8 inches and an outer diameter of steering wheel 150 is approximately 15 inches.

The operator may frequently use button 32 during a scrubbing operation in order to warn pedestrians in the area of the approaching machine 100, and may also frequently use one or both of buttons 33 in order to avoid leaving puddles of fluid behind when turning machine 100 from a first scrubbing path to a second scrubbing path. Buttons 32 and 33 may be described as curved, semi-circular or C-shaped, and encircle a portion of the panel 230 along and around an outer periphery of face of the hub 130. By being located adjacent to the outer periphery of the panel 230, they can be easily reached by the thumbs or fingers while keeping the hand in contact with the steering wheel 150. Furthermore, by encircling a portion of the hub 130, the buttons 32 and 33 remain within reach of the thumbs or fingers even as the hands are moves as the steering wheel 150 is turned by the operator. To provide for an easy reach while turning, bottom 32 occupies nearly the entire upper half of the periphery of the panel, or an arc of approximately 180 degrees of the circumference of the hub 130. In the embodiment shown, button 32 extends across the top center of the hub 130, with equal portions of both the left and right sides of the panel 30 (as viewed by the operator) to allow easy reach by either the left or right hand. Furthermore, as the steering wheel 150 is turned and the operators hands circle around the top of the hub 130, one of the operators hands remains within reach of button 33. Alternatively, button 32 could be smaller, such as about 60 degrees or about 90 degrees, or could be larger, such as 270 degrees or even 360 degrees, and it could be located on the lower half of the hub 130. In some embodiments, button 32 may be between about 150 and about 210 degrees.

In the embodiment shown, buttons 33 occupy approximately one sixth of the circumference of the panel 230 periphery, or an arc of about 60 degrees, and are located on the lower half of the panel 230 (as viewed by the operator), with buttons 331 and 332 located in the midline and separating them. Alternatively, buttons 33 could occupy an arc of about 45 to about 90 degrees. In some embodiments, buttons 33 occupy between about one quarter and one eighth of the circumference of the periphery of panel 230. According to the illustrated embodiment, buttons 33 are redundant, with one on each side of the midline (on the left and right sides as viewed by the operator) and in mirror image locations, so that either may be used to turn fluid flow on and off. According to some alternate embodiments, buttons 33 may be adapted to only turn fluid flow off for a prescribed time, for example, that necessary for an operator to turn machine 100, after which the flow is automatically turned back on. Alternatively, a single button 33 could be provided which could extend across the midline of the panel 230, if buttons 331 and 332 were not present in this location, to occupy a larger arc, such as an arc of approximately 120 to 180 degrees of the circumference or the periphery of panel 230.

Buttons 331 and 332 are shown grouped with an active display 333, and, according to the illustrated embodiment, are used to select, among three levels, the flow rate of fluid being dispensed from scrubbing solution tank of machine 100, by incrementally increasing, via button 331, and incrementally decreasing, via button 332; the lowest flow rate is indicated by a single illuminated dot of display 333, the medium level by two illuminated dots and the highest by three illuminated dots. When either of buttons 33 is used to turn off the flow of fluid, none of the dots of display 333 are illuminated. Like buttons 331 and 332, button 34 is also grouped with an active display 343 formed by three dots. Button 34 is used to select a pressure applied by the scrubbing brushes of machine 100 from among three pressure levels, wherein each successive push of button 34 incrementally changes the pressure level; the number of dots of display 343 that are illuminated indicates the selected pressure level, from the lowest at one dot to the highest at three dots.

Button 35 is shown grouped with an active display 353, which is formed by a single dot. The single dot of display 353 may be illuminated when the vacuum-assisted squeegee of machine 100 is positioned down against the floor surface being cleaned, in order to draw soiled scrubbing fluid up into the recovery tank of machine 100. When display 353 is illuminated and button 35 is pushed, the display is not longer illuminated, the squeegee is lifted up and the vacuum deactivated; this condition of the squeegee is useful when an operator desires to leave scrubbing fluid on the floor surface for a period of time before passing back over the floor surface to scrub a second time.

Figures 4A, 4B, 4C:
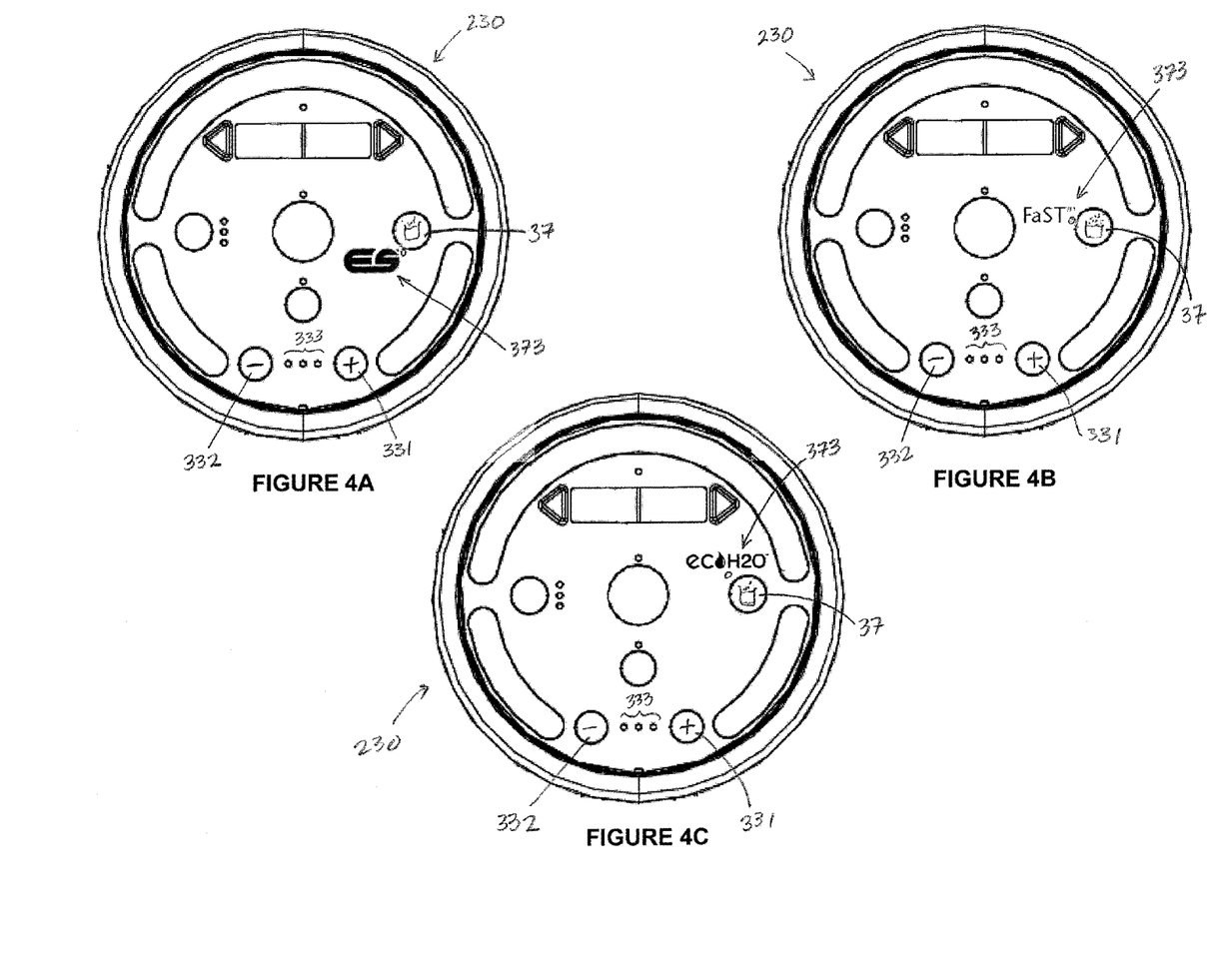
FIGS. 4A, 4B, and 4C are plan views of alternative embodiments of panels with scrubbing technologies.

Button 37 is shown grouped with an active display 373 and may be used to activate a special scrubbing technology that is built into machine 100. According to the illustrated embodiment, the special scrubbing technology that is built into machine 100 may be one of a number of different technologies, each of which is intended to enhance the standard scrubbing operation of machine 100, according to a particular application. Display 373 may be divided into several portions, so that when button 37 is pushed to activate the special scrubbing technology that is built into the machine, only one of the several portions of display 373 is illuminated. When assembling hub console assembly 130 of machine 100, an LED is positioned in the electronics module 220, so that when panel 230 is assembled thereover, the LED illuminates that portion display 373 which corresponds to the special scrubbing technology that has been included in machine 100. FIGS. 4A-C illustrate each of the three available portions of display 373 for panel 230, according to some exemplary embodiments, wherein each of three special scrubbing technologies are ones that are made available on scrubbing machines, such as the aforementioned models T7 and T20 commercially available from Tennant Company, the assignee of the present invention disclosure. Each of the designations for the three technologies, as illustrated in FIGS. 4A-C, are registered trademarks of Tennant Company.

According to FIG. 4A, machine 100 includes an extended scrub (ES®) as the special scrubbing technology. When button 37 is used to turn on the ES® technology, a recycling system is activated so that soiled scrubbing fluid drawn from the floor being scrubbed may be reused. The recycling system may draw the soiled scrubbing fluid through a screen and back into the scrubbing fluid tank and may further mix the screened fluid with a metered amount of fresh detergent, for example, that is dispensed from an auxiliary tank of machine 100, prior to reapplying the fluid for further scrubbing. When the ES® technology is activated, increasing and decreasing fluid flow, via buttons 331, 332 may also impact the metering of fresh detergent for mixing with fluid from recovery tank.

According to FIG. 4B, machine 100 includes a foam scrubbing technology (FaST®), which is activated, via button 37, to inject air to form a foam from a water and detergent mixture; and, according to FIG. 4C, machine 100 includes an electrically converted water technology (ec·H2O™) which is activated, via button 37, to create an alkaline and acidic mix for the scrubbing fluid without using any detergent. If machine 100 includes either of these special scrubbing technologies and one is activated via button 37, only one fluid flow rate may be allowed so that buttons 331 and 332 become disabled. Display 333 may indicate the allowed flow rate level in this situation.

Upon completion of scrubbing operations, hub console assembly 130 may be powered down by pushing button 31. According to preferred embodiments, electronics module 220 is designed to maintain settings from the completed scrubbing operation when machine 100 is powered down, so that, when button 31 is pressed to power up scrubbing operations again, machine 100 can be operated without further adjustment, if so desired.

With reference back to FIG. 3, various standard buttons that may be included on dash board 140 include: the aforementioned keyed starter 41, a head and tail light on/off switch 44, a forward/reverse toggle switch 43, and an electrical disconnect switch 42 to shut down all machine operation, for example, in an emergency situation. Additional dash board buttons may be provided for additional optional features of machine 100, for example, a switch to alternately extend and retract side brushes and a switch to activate a hand-held nozzle sprayer.

Figure 5A:
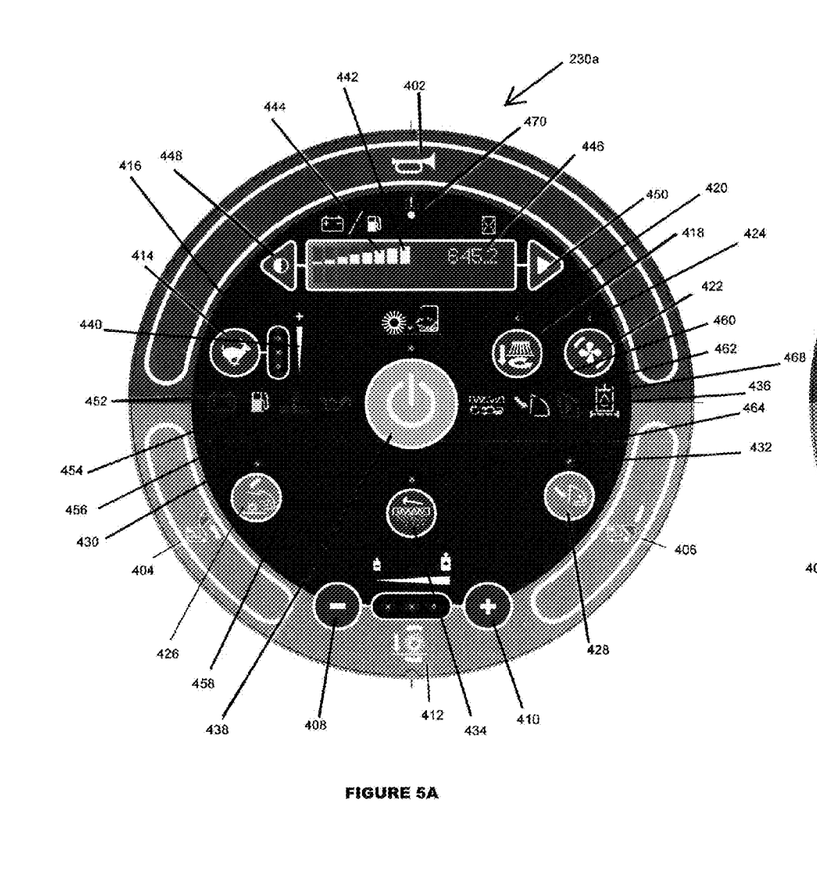
FIGS. 5A and 5B are plan views of another embodiment of a panel with warning lights on and off.
Figure 5B:
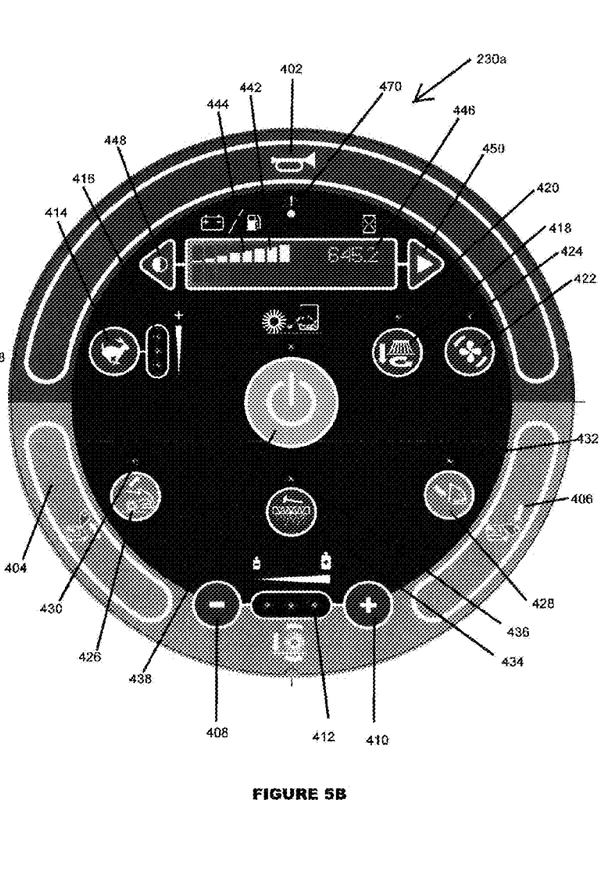

An alternative embodiment of a panel is shown in FIGS. 5A and 5B for a panel 230a which may be used with sweeper machines. Like panel 230, panel 230a includes various buttons and active displays and optional icon markings for controlling and monitoring operations of the machine 100, though the actual layout and functions differ. Also like the embodiments shown in FIGS. 3 and 4, this embodiment includes a large, semicircular or C shaped horn activating button 402 extending around a portion of the circumference of the panel 230a at the perimeter of panel 230a. In the embodiment shown, the horn button 402 extends nearly or approximately half way around the circumference of the periphery of the panel 230a, on the upper half of the panel 230a (or about 180 degrees), with equal portions on the left and right sides of the panel 230a. The horn button 402 could alternatively be smaller, such as about 60 degrees or about 90 degrees or could be larger, such as about 270 degrees or even about 360 degrees. For example, it could be between about 150 and 210 degrees.

The panel 230a further includes C shaped or semi circular buttons at or adjacent to the periphery of the panel 230a to control cleaning functions. In this embodiment, one C shaped button 404 may be depressed to raise the hopper up, while a second C shaped button 406, in a mirror image location on the opposite side of the panel 230a may be depressed to lower the hopper down, and each of these buttons 404, 406 includes a picture demonstrating these functions. As activities which need to be engaged repeatedly during operation of the sweeper, buttons 404, 406 are well suited to placement along the perimeter and having an increased size (arc length) so that they can be easily depressed without the operator removing his hands from the steering wheel 150, even when the steering wheel 150 has been turned. In the embodiment shown, the hopper up button 404 and the hopper down button 406 are located in the lower half of the panel 230a, though they could alternatively be located in the upper half of the panel 230a (with the horn in the lower half). They occupy about 1/6th of the circumference of the periphery, or about 60 degrees, though they could alternatively occupy between about 30 and about 90 degrees.

Also located at the periphery, though with standard round buttons marked with a plus and minus sign, are buttons 408 and 410. Button 408 decreases brush downward pressure while button 410 increases brush downward pressure. Adjacent to these buttons is a display 412 which is a row of lights which displays the brush pressure.

Various other buttons and displays are located more centrally on the panel 230a. Button 414 controls the engine speed and is marked with the image of a rabbit. A display 416 is adjacent to button 414 and is a row of three indicator lights which are illuminated to display speed. Button 418 turns on and off a side brush and is marked with an image of a brush. Alongside button 418 is a display 420 which is a single dot of light which becomes illuminated when the brush is on. Button 422 turns on and off a sweeper vacuum and is marked with an image of a rotating fan. An associated display 424 is alongside button 422 and is a single dot of light which becomes illuminated when the vacuum is on. Buttons 426 and 428 are located at mirror image locations on left and right sides of panel 230a. Button 426 opens hopper door and has an associated display 430 which is a dot of light adjacent to button 426 which is illuminated to indicate that the hopper door is open. Button 428 closes the hopper door and likewise has an associated display 432 which is a dot of light adjacent to button 428 which is illuminated to indicate that the hopper door is closed. Button 434 is a filter shaker which cleans the filter. An associated display 436 adjacent to button 434 is a single dot of light which is illuminated to indicate the filter is being cleaned by activation of the filter shaker button 434. At the center of the panel 230a is a button 438 which is pressed to power up sweeping operations and an associated power display 440, a single dot positioned alongside the button, which is illuminated when the power is on.

Panel 230a may include an active display 442 for displaying various information, including strings of information in alphanumeric form, as described above with regard to active display 36. In the embodiment shown, the left portion of the display 442 is a battery/fuel life display 444 showing a row of bars of increasing height. The right portion of display 442 is a time display 446, showing a numerical value of the total operating hours of the machine 100. Button 448 to the left of the display 442 is triangular and may be used for contrast adjustment or selecting items displayed on display 442, while button 450 on the right of display 442 is also triangular and may be used to navigate through functions and features shown on display 442.

Panel also may include one or more active displays which are warning lights with symbolic pictures which may become illuminated when certain conditions are detected by machine 100. In FIG. 5A, warning lights 452, 454, 456, 458, 460, 462, 464, 468 are illuminated for demonstration purposes. These include warning light 452 indicating a system charging malfunction, warning light 454 indicating that the fuel is low, warning light 456 indicating that the water temperature is elevated, warning light 458 indicating that oil pressure is low, warning light 460 indicating that a filter is clogged, warning light 464 indicating that the hopper contents are hot, and warning light 468 indicating that the hydraulic filter is clogged. Warning light 462 indicates that the hopper door is closed and becomes illuminated if sweeping operations are engaged while the hopper door is closed to indicate that swept debris is not able to enter the hopper. In FIG. 5B, the warning lights are not illuminated, indicating that these conditions are not present. In addition, display 470 is a single dot of light which is indicated as an alert. The alert display 470 is illuminated when there is a problem with the machine 100, and an associated fault code identifying the problem may be shown on the display 442. In addition, any relevant warning lights may also be illuminated.

In alternative embodiments, panel 230, 230a may include various combinations of buttons and displays in various locations besides those shown. For example, a panel for a sweeper and scrubber machine may include a combination of any or all of the buttons and displays as described with regard to panels 230 and 230a, and these may be in the same or different locations as presented above.

In the foregoing detailed description, the invention has been described with reference to specific embodiments. However, it may be appreciated that various modifications and changes can be made without departing from the scope of the invention.

The invention claimed is:

1. A floor surface maintenance vehicle comprising:
a frame;
a plurality of wheels;
a cleaning component extending from an underside of the frame;
a steering wheel having an outer ring, and a central aperture connected concentrically to a steering shaft and rotatable about a central axis;
a steering wheel hub located within the central aperture of the steering wheel and having a panel, wherein the panel is stationary relative to the central axis;
a first button provided on the panel, the first button is C-shaped and extends around a portion of a periphery of the panel, the first button being stationary with respect to the central axis of the hub, the first button being disposed at a distance from the outer ring of the steering wheel such that the first button is actuable by an operator's fingers when the operator's fingers moves with respect to the stationary central axis when turning the steering wheel, the first button controls a cleaning operation of the vehicle.

2. The floor surface maintenance vehicle of claim 1 wherein the first button occupies an arc of about 30 to about 90 degrees of a circumference of the periphery of the panel.

3. The floor surface maintenance vehicle of claim 2 further comprising a second button on the panel, wherein the second button occupies an arc of about 30 to about 90 degrees of a circumference of the periphery of the panel, wherein the second button controls a cleaning operation of the vehicle.

4. The floor surface maintenance vehicle of claim 3 wherein the first and second buttons each control the same cleaning function.

5. The floor surface maintenance vehicle of claim 4 wherein the first and second buttons each turn on and turn off a flow of a fluid from a fluid tank.

6. The floor surface maintenance vehicle of claim 5 wherein the first and second buttons are located at mirror image locations on opposite sides of the panel.

7. The floor surface maintenance vehicle of claim 3 wherein the first button moves a hopper up, and the second button moves the hopper down.

8. The floor surface maintenance vehicle of claim 1 wherein the first button is located in approximately one half of the circumference of the panel.

9. The floor surface maintenance vehicle of claim 8 wherein the first button controls a horn.

10. The floor surface maintenance machine of claim 8 wherein the first button is located on a top half of the panel.

11. The floor surface maintenance machine of claim 1 wherein the first button is located in approximately one half of the circumference of the periphery of the panel, further comprising a second and a third button, wherein each of the second and third buttons are C-shaped, extend around a portion of the periphery of the panel, and occupy between about one eighth to about one quarter of the circumference of the periphery of the panel.

12. The floor surface maintenance machine of claim 11 wherein the first button is a horn and the second and third buttons control a flow of fluid from the fluid tank.

13. The floor surface maintenance machine of claim 11 wherein the first button is a horn, the second button moves a hopper up, and the third button moves the hopper down.

14. The floor surface maintenance machine of claim 1 further comprising:
a second button located on the panel in a location which is more centrally located than the first button, wherein the second button controls a cleaning function of the vehicle; and
an indicator light located in proximity to the second button which is illuminated when the function of the second button has been activated.

15. A floor surface maintenance vehicle comprising:
a frame;
a plurality of wheels,
a fluid tank;
a cleaning component extending from an underside of the frame;
a steering wheel having a central aperture connected concentrically to a steering shaft and rotatable about a central axis;
a steering wheel hub located within the central aperture of the steering wheel and having a panel, wherein the panel is stationary relative to the central axis;
a first button provided on the panel for controlling a cleaning function of the vehicle, the first button is C-shaped and extends around a portion of a periphery of the panel; and
a second button provided on the panel for controlling a horn, the second button is C-shaped and extends around a portion of a periphery of the panel, the first button occupying an arc of about greater than 90 degrees of a circumference of the periphery of the panel, the first and second buttons each being stationary with respect to the central axis of the hub, the first and second buttons being disposed at a distance from the outer ring of the steering wheel such that the first and second buttons is actuable by an operator's fingers when the operator's fingers moves with respect to the stationary central axis when turning the steering wheel.

16. The floor surface maintenance vehicle of claim 15 wherein the first C-shaped button starts and stops a flow of fluid from the fluid tank.

17. The floor surface maintenance vehicle of claim 16 further comprising one or more buttons to increase or decrease the rate of flow of fluid from the fluid tank.

18. The floor surface maintenance vehicle of claim 15 wherein the first C-shaped button raises a hopper.

19. A method cleaning a floor comprising: activating a floor surface maintenance vehicle, the floor surface maintenance vehicle comprising:
a frame;
a plurality of wheels;
a fluid tank for storing a fluid;
a cleaning component extending from an underside of the frame;
a steering wheel having a central aperture connected concentrically to a steering shaft and rotatable about a central axis;
a steering wheel hub located within the central aperture of the steering wheel and having a panel, wherein the panel is stationary relative to the central axis;
a first button provided on the panel, wherein the first button is C-shaped and extends around a portion of a periphery of the panel, the first button being stationary with respect to the central axis of the hub, the first button being disposed at a distance from the outer ring of the steering wheel;
driving the floor surface maintenance vehicle over the floor to be cleaned; and
pressing the first button with an operator's fingers when moving the operator's fingers with respect to the stationary central axis when turning the steering wheel to control a cleaning function of the vehicle while steering the vehicle.

* * * * *